United States Patent
Mongillo et al.

(10) Patent No.: US 10,502,067 B2
(45) Date of Patent: Dec. 10, 2019

(54) DUAL-FED AIRFOIL TIP

(71) Applicant: United Technologies Corporation, Farmington, CT (US)

(72) Inventors: Dominic J. Mongillo, West Hartford, CT (US); Parth Jariwala, Iselin, NJ (US); Bret M. Teller, Meriden, CT (US); Mark F. Zelesky, Bolton, CT (US); James Tilsley Auxier, Bloomfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 581 days.

(21) Appl. No.: 15/143,717

(22) Filed: May 2, 2016

(65) Prior Publication Data
US 2017/0211396 A1 Jul. 27, 2017

Related U.S. Application Data

(60) Provisional application No. 62/281,954, filed on Jan. 22, 2016.

(51) Int. Cl.
*F01D 5/18* (2006.01)
*F01D 25/12* (2006.01)
(Continued)

(52) U.S. Cl.
CPC ............ *F01D 5/187* (2013.01); *F01D 9/02* (2013.01); *F01D 25/12* (2013.01); *F04D 29/324* (2013.01);
(Continued)

(58) Field of Classification Search
CPC . F01D 5/187; F01D 9/02; F01D 25/12; F01D 5/188; F01D 5/189; F01D 5/18;
(Continued)

(56) References Cited

U.S. PATENT DOCUMENTS

| 9,546,554 B2* | 1/2017 | Crites ................. F01D 5/187 |
| 2006/0153678 A1* | 7/2006 | Liang ................. F01D 5/187 |
| | | 416/97 R |

(Continued)

FOREIGN PATENT DOCUMENTS

| EP | 1510653 | 3/2005 |
| WO | 9412766 | 6/1994 |
| WO | 2011161188 | 12/2011 |

OTHER PUBLICATIONS

European Search Report, European Application No. 17152351.7, dated May 19, 2017, European Patent Office; European Search Report 7 pages.

*Primary Examiner* — Justin D Seabe
*Assistant Examiner* — Justin A Pruitt
(74) *Attorney, Agent, or Firm* — Cantor Colburn LLP

(57) ABSTRACT

An airfoil of a gas turbine engine is provided including a leading edge extending in a radial direction, a tip extending in an axial direction from the leading edge, a first rib extending radially within the airfoil, the leading edge and the first rib defining a leading edge cavity within the airfoil, a second rib, the second rib and the first rib defining a serpentine cavity therein, a third rib extending axially within the tip, a flag tip cavity defined by the third rib, the leading edge, and the tip, the leading edge cavity fluidly connected to the flag tip cavity, and a bypass aperture formed between the first rib and the third rib, the bypass aperture configured to fluidly connect the serpentine cavity with the flag tip cavity.

15 Claims, 7 Drawing Sheets

(51) Int. Cl.
*F04D 29/32* (2006.01)
*F04D 29/58* (2006.01)
*F01D 9/02* (2006.01)
*F04D 29/54* (2006.01)

(52) U.S. Cl.
CPC ......... *F04D 29/542* (2013.01); *F04D 29/582* (2013.01); *F05D 2220/32* (2013.01); *F05D 2250/185* (2013.01); *F05D 2260/202* (2013.01); *F05D 2260/22141* (2013.01); *F05D 2260/606* (2013.01)

(58) Field of Classification Search
CPC .... F04D 29/324; F04D 29/542; F04D 29/582; F05D 2220/32; F05D 2250/185; F05D 2260/202; F05D 2260/22141; F05D 2260/2214; F05D 2260/2212; F05D 2260/607; F05D 2260/606; F02C 7/00; F02C 7/12
USPC ...................................................... 416/97 R
See application file for complete search history.

(56) References Cited

U.S. PATENT DOCUMENTS

2007/0041835 A1* 2/2007 Charbonneau .......... F01D 5/187
            416/97 R
2010/0226789 A1  9/2010 Liang
2013/0280080 A1 10/2013 Levine et al.

* cited by examiner

DUAL-FED AIRFOIL TIP

CROSS-REFERENCE TO RELATED APPLICATIONS

The present application claims priority from U.S. Provisional Patent Application No. 62/281,954, filed Jan. 22, 2016. The contents of the priority application are hereby incorporated by reference in their entirety.

BACKGROUND

The subject matter disclosed herein generally relates to airflow in components of gas turbine engines and, more particularly, to dual-fed airfoil tips in components of gas turbine engines.

Airfoils, and particularly airfoils of gas turbine engines, may include internal flow passages to enable cooling of the airfoils. At various points within the airfoil cooling configurations, air may be bled from and/or between the internal flow passages. In gas turbine engines, one way to improve efficiency is by increasing the pressure and temperature of the compressed and combusted air, from which the turbine extracts work. Thus more highly-evolved turbines see ever-increasing gaspath and cooling air temperatures, which presents a challenge as the gaspath temperatures often exceed incipient melting temperatures of the constituent alloys of the airfoils. Complex internal cooling schemes may be configured to supply convective cooling and source film cooling. The airfoils may be produced by methods commonly used in the investment casting process of superalloys with alumina or silica ceramic cores, as well as, produced using additive manufacturing processes to directly fabricate the core by using Direct Metal Laser Sintering (SMLS) and/or Electron Beam Machining (EBM) processes.

The supply of the cooling air through cavities of the airfoils may be carefully designed so as to provide an efficient cooling configuration. As the amount of cooling air required to convectively and/or film cool greater heat loads increases, the areas through which the cooling air must pass to serve its function do not necessarily proportionally increase. This presents an issue as there are deleterious effects associated with increasing the Mach number through the internal cavities of the airfoil. A common "pinch point" where a cavity Mach number may increase above an acceptable level is in the neck of an airfoil near the radial level of the platform, affecting typically leading-edge and trailing-edge feeds.

At the same time, it is often desirable to provide a tip flag cavity underneath or within the proximity of the tip of an airfoil (e.g., a high pressure turbine blade), which is traditionally fed from a leading-edge feed cavity. The cooling air supply requirement for this cavity may increase the demand on the leading-edge feed, at times, to supply cooling air above an optimal level of flow.

SUMMARY

According to one embodiment, an airfoil of a gas turbine engine is provided. The airfoil includes a leading edge extending in a radial direction, a tip extending in an axial direction from the leading edge, a first rib extending radially within the airfoil, the leading edge and the first rib defining a leading edge cavity within the airfoil, a second rib, the second rib and the first rib defining a serpentine cavity therein, a third rib extending axially within the tip, a flag tip cavity defined by the third rib, the leading edge, and the tip, the leading edge cavity fluidly connected to the flag tip cavity, and a bypass aperture formed between the first rib and the third rib, the bypass aperture configured to fluidly connect the serpentine cavity with the flag tip cavity.

In addition to one or more of the features described above, or as an alternative, further embodiments of the airfoil may include a divider portion located proximate to the bypass aperture within the serpentine cavity and configured to aid in directing (i) a first portion of air from the serpentine cavity into the flag tip cavity and (ii) a second portion of air within the serpentine cavity.

In addition to one or more of the features described above, or as an alternative, further embodiments of the airfoil may include that the divider portion is connected to the third rib.

In addition to one or more of the features described above, or as an alternative, further embodiments of the airfoil may include that the divider portion extends a predetermined length into the serpentine cavity.

In addition to one or more of the features described above, or as an alternative, further embodiments of the airfoil may include that the divider portion has a tapered tip extending into the serpentine cavity.

In addition to one or more of the features described above, or as an alternative, further embodiments of the airfoil may include a trip strip configured to aid in airflow from the serpentine cavity to the flag tip cavity through the bypass aperture.

In addition to one or more of the features described above, or as an alternative, further embodiments of the airfoil may include that the first rib includes a direction portion proximate to the bypass aperture.

In addition to one or more of the features described above, or as an alternative, further embodiments of the airfoil may include that a width of the serpentine cavity between the first rib and the second rib is a first width and a width of the bypass aperture is a second width, wherein the second width is less than the first width.

According to another embodiment, a gas turbine engine is provided. The gas turbine engine includes an airfoil having a leading edge extending in a radial direction, a tip extending in an axial direction form the leading edge, a first rib extending radially within the airfoil, the leading edge and the first rib defining a leading edge cavity within the airfoil, a second rib, the second rib and the first rib defining a serpentine cavity therein, a third rib extending axially within the tip, a flag tip cavity defined by the third rib, the leading edge, and the tip, the leading edge cavity fluidly connected to the flag tip cavity, and a bypass aperture formed between the first rib and the third rib, the bypass aperture configured to fluidly connect the serpentine cavity with the flag tip cavity.

In addition to one or more of the features described above, or as an alternative, further embodiments of the gas turbine engine may include a divider portion located proximate to the bypass aperture within the serpentine cavity and configured to aid in directing (i) a first portion of air from the serpentine cavity into the flag tip cavity and (ii) a second portion of air within the serpentine cavity.

In addition to one or more of the features described above, or as an alternative, further embodiments of the gas turbine engine may include that the divider portion is connected to the third rib.

In addition to one or more of the features described above, or as an alternative, further embodiments of the gas turbine engine may include that the divider portion extends a predetermined length into the serpentine cavity.

In addition to one or more of the features described above, or as an alternative, further embodiments of the gas turbine engine may include that the divider portion has a tapered tip extending into the serpentine cavity.

In addition to one or more of the features described above, or as an alternative, further embodiments of the gas turbine engine may include that the divider portion is angled relative to a direction normal to the third rib.

In addition to one or more of the features described above, or as an alternative, further embodiments of the gas turbine engine may include that the first rib includes a direction portion proximate to the bypass aperture.

In addition to one or more of the features described above, or as an alternative, further embodiments of the gas turbine engine may include that a width of the serpentine cavity between the first rib and the second rib is a first width and a width of the bypass aperture is a second width, wherein the second width is less than the first width.

According to another embodiment, a method of manufacturing an airfoil of a gas turbine engine is provided. The method includes forming an airfoil body having a leading edge cavity, a flag tip cavity, and a serpentine cavity, wherein the leading edge cavity is in fluid communication with the flag tip cavity and forming a bypass aperture to fluidly connect the serpentine cavity and the flag tip cavity.

In addition to one or more of the features described above, or as an alternative, further embodiments of the method may include forming a divider portion located proximate to the bypass aperture within the serpentine cavity and configured to aid in directing (i) a first portion of air from the serpentine cavity into the flag tip cavity and (ii) a second portion of air within the serpentine cavity.

In addition to one or more of the features described above, or as an alternative, further embodiments of the method may include that the airfoil is integrally formed by one of molding, casting, or additive manufacturing.

In addition to one or more of the features described above, or as an alternative, further embodiments of the method may include forming a direction portion proximate to the bypass aperture on a rib between the leading edge cavity and the serpentine cavity.

Technical effects of embodiments of the present disclosure include reduced Mach numbers in a leading-edge feed within an airfoil. Further technical effects may include reduced risk of flow disturbances and viscous losses while optimizing heat transfer, total-pressure, and static pressure requirements within internal cavities of the airfoil. Further technical effects include a dual-fed flag tip cavity of an airfoil.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
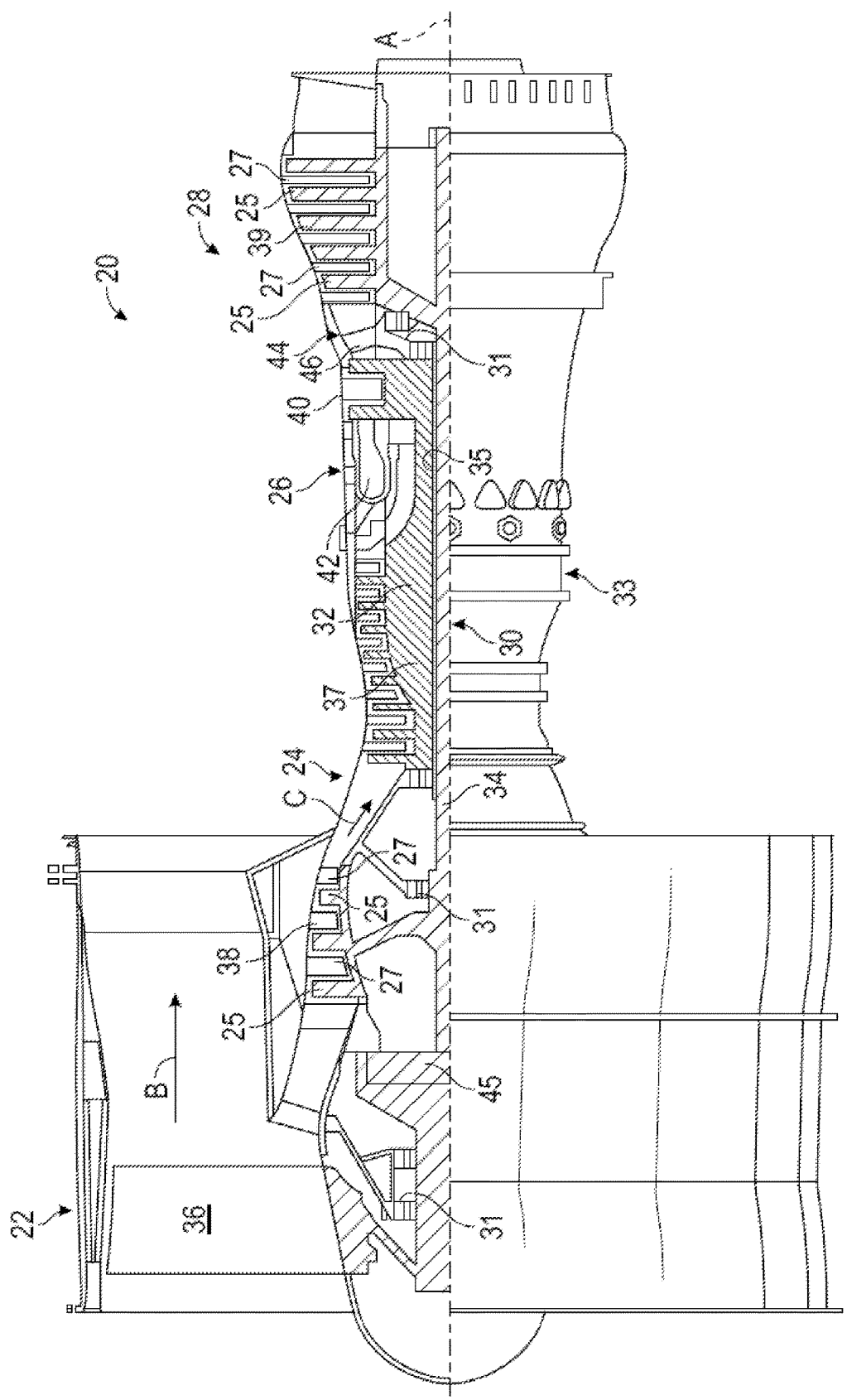
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ ^\circ R)/(518.7^\circ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
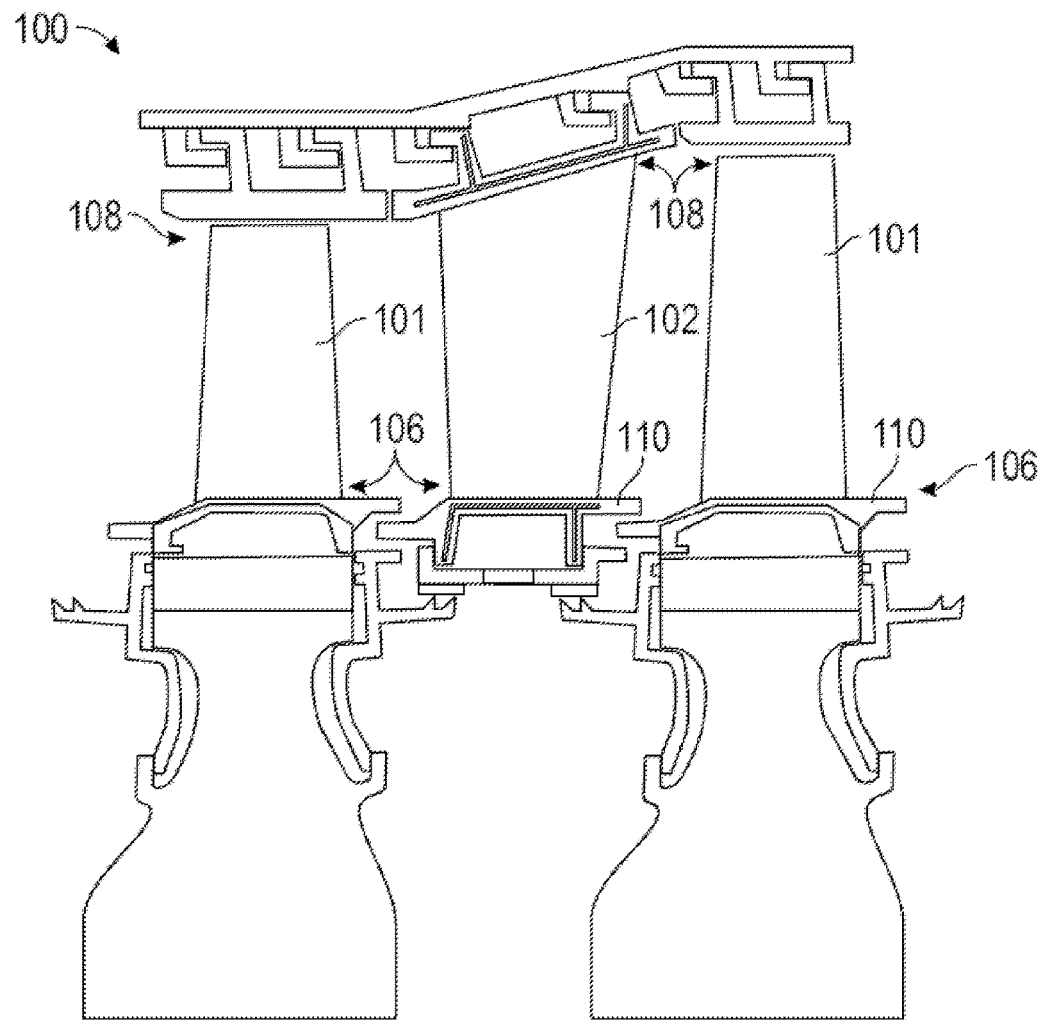
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110.

Although an aero or aircraft engine application is shown and described above, those of skill in the art will appreciate that airfoil configurations as described herein may be applied to industrial applications and/or industrial gas turbine engines, land based or otherwise.

Figure 2A:
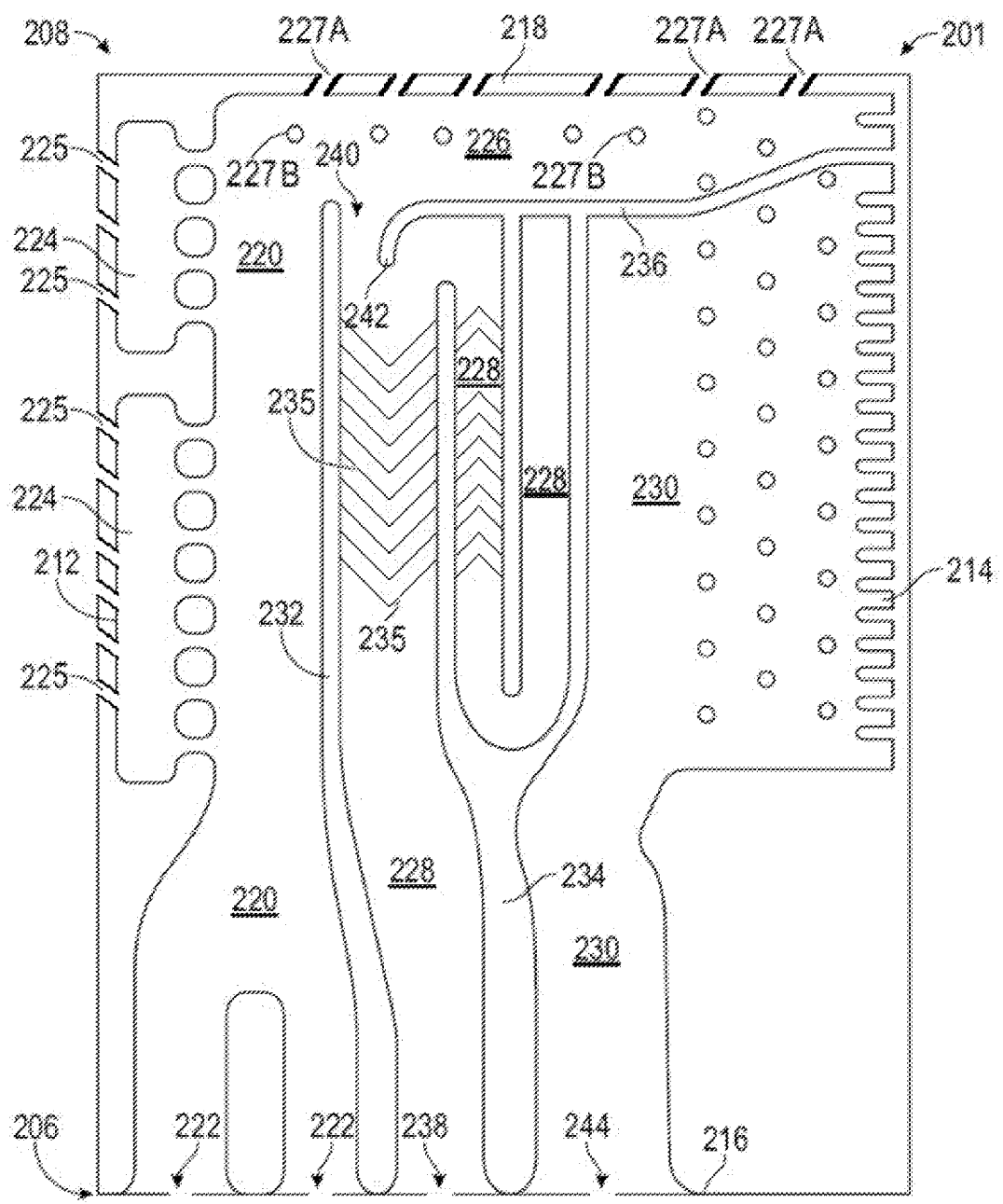
FIG. 2A is a cross-sectional schematic illustration of internal cavities of an airfoil in accordance with an embodiment of the present disclosure.
Figure 2B:
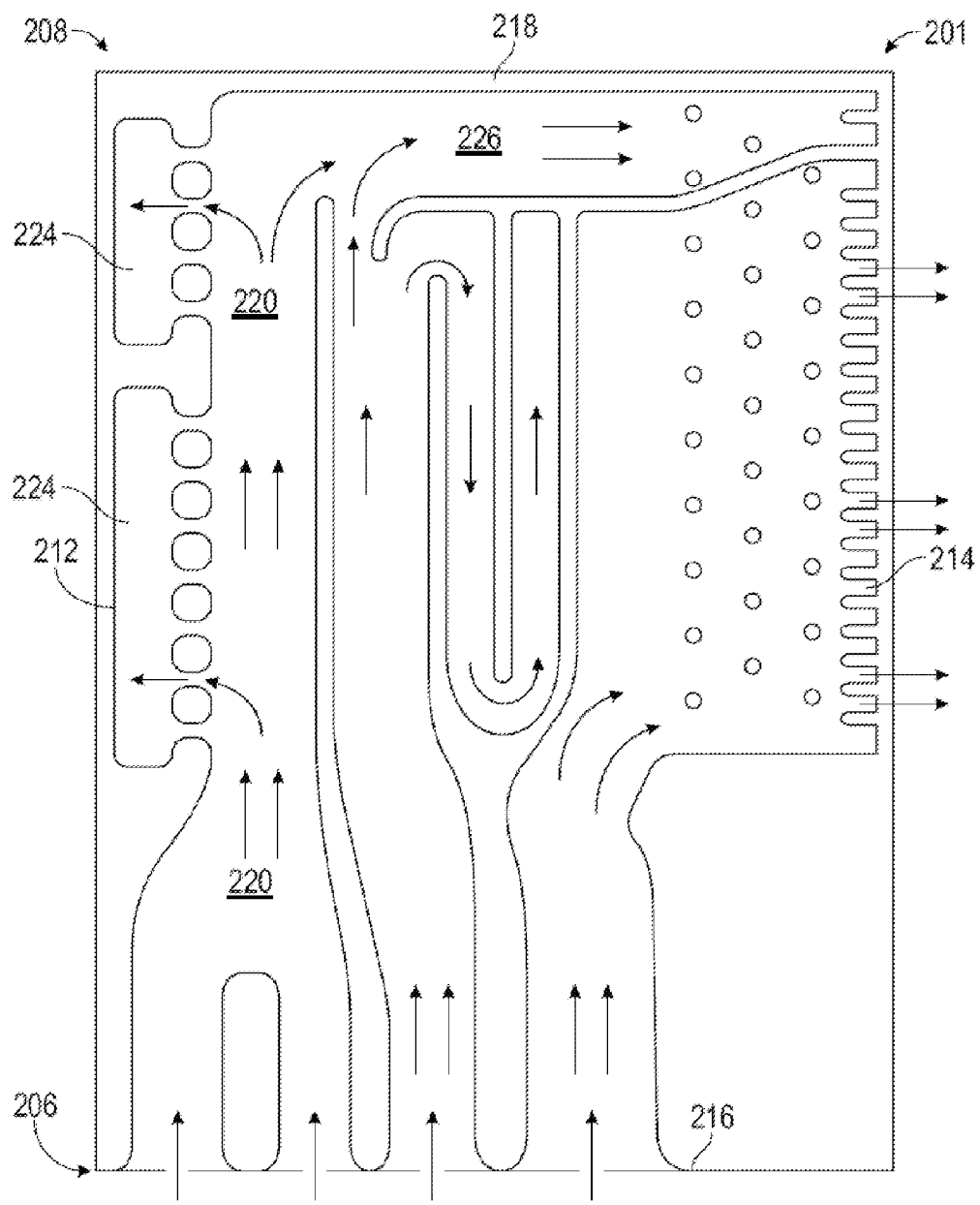
FIG. 2B is a schematic illustration of the airfoil of FIG. 2A indicating air flow within the internal cavities of the airfoil.

Turning now to FIGS. 2A and 2B, views of an airfoil interior structure in accordance with a non-limiting embodiment of the present invention are shown. FIG. 2A is a cross-sectional view of airflow passages within an airfoil, such as a blade, having flow path structures in accordance with an embodiment of the present disclosure. FIG. 2B is another view of the airfoil of FIG. 2A, but showing the airflow path within the airfoil (without optional leading edge film cooling holes, flag tip film cooling holes, or trip strips). Those of skill in the art will appreciate that airflow passages as described herein may be applied to any type of airfoil or other component, such as blades, vanes, blade outer air seals, mid-turbine frames, turbine exhaust cases, etc.

As shown, an airfoil 201, such as a turbine blade in a gas turbine engine, may define an airfoil body extending axially (with respect to an engine) from a leading edge 212 to a trailing edge 214. Further, the airfoil body may extend radially from a root 216 at an inner diameter 206 to a tip 218 at an outer diameter 208. The airfoil body may define one or more cavities therein that are configured to enable cooling of the airfoil 201.

A first flow path may be at the leading edge 212 of the airfoil and include a leading edge feed cavity 220. Air may enter the leading edge cavity 220 at one or more leading feed cavity apertures 222 that are formed in the root 216. The air may then flow from the root 216 toward the tip 218. As the air flows through the leading edge cavity 220 a portion of the air may flow into one or more impingement cavities 224 positioned along the leading edge 212 of the airfoil 201. The airflow path is shown by the arrows indicated in FIG. 2B. As shown, the leading edge cavity 220 is configured substantially vertical or radially extending within the airfoil 201.

Air from the leading edge cavity 220 may then turn and enter a flag tip cavity 226. The flag tip cavity 226 may be a horizontally or axially oriented cooling air cavity configured at the tip 218 of the airfoil 201. The flag tip cavity 226 may extend axially along the tip 218 of the airfoil 201 from the leading edge 212 to the trailing edge 214.

The airfoil 201 may also include one or more internal serpentine cavity 228. The serpentine cavity 228 may be configured to provide cooling to an interior or central portion of the airfoil 201 that is between the leading edge cavity 220 and a trailing edge cavity 230. A first partition or first rib 232 may separate the leading edge cavity 220 and the serpentine cavity 228. Further a second partition or second rib 234 may separate the trailing edge cavity 230 and the serpentine cavity 228. The serpentine cavity 228 may be separated from the flag tip cavity 226 by a third partition or third rib 236. The serpentine cavity 228 may be configured in a serpentine manner that is configured to distribute air from one or more serpentine cavity apertures 238 through the serpentine cavity 228 as shown in FIG. 2B. The first rib 232 and the second rib 234 may extend radially within the airfoil 201, e.g., with respect to an orientation as installed in an engine.

Additionally, a portion of the air within the serpentine cavity 228 may flow through a bypass aperture 240 located at an outer diameter of the serpentine cavity 228 and proximal to the leading edge cavity 220 and into the flag tip cavity 226. The bypass aperture 240 may be formed in the axially extending third rib 236, i.e., the bypass aperture 240 may be formed in the partition that separates the serpentine cavity 228 from the flag tip cavity 226. In some embodiments, and as shown in FIGS. 2A and 2B, the axially extending partition 236 may include a divider portion 242 that may extended radially inward from the axially extending partition 236 into the serpentine cavity 228. The divider portion 242 may be configured to aid in the airflow separation at the bypass aperture 240. An airfoil configured with a bypass aperture as shown may have a dual-fed flag tip cavity that may receive more air and air pressure than a traditional configuration that may have the flag tip cavity fed only from the leading edge cavity.

At the trailing edge 214, air may enter the airfoil 201 through a trailing edge cavity aperture 244. The air within the trailing edge cavity 230 may flow out of the tip trailing edge section of the airfoil 201 through one or more exit ports, as shown in FIG. 2B.

In reference to FIGS. 2A-2B, and other embodiments provided herein, there are several benefits associated with this type of airfoil cooling design architecture. For example, higher pressure and colder cooling air supplied from serpentine cavity 228 can be mixed with the lower pressure, hotter fluid from the leading edge cavity 220. In this manner the higher pressure air supplied to the flag tip cavity 226 back pressures the mass flow in the leading edge cavity 220. The reduction in the velocity of the cooling flow in the leading edge cavity 220 enables an increase in pressure ratio across the leading edge cavity 220 which enables more cooling flow to be passed through operational leading edge showerhead holes 225, providing increased convective and film cooling to the highest external heat flux location on the airfoil surface. Additionally, the higher static pressure in the leading edge cavity 220 also ensures that minimum pressure ratio requirements are maintained across the leading showerhead holes 225 in order to prevent entrainment or ingestion of the hot external gas fluid into the leading edge showerhead holes 225.

Additionally, the colder higher pressure cooling fluid flow that is provided from serpentine cavity 228 through bypass aperture 240 results in an increase in both the total and static pressure in the flag tip cavity 226. The higher pressure in the flag tip cavity 226 enables more cooling flow to be exhausted through optional local tip film cooling holes 227A and/or optional pressure side tip film cooling holes 227B and a tip trailing edge section of airfoil 201, thereby increasing the local convective heat transfer, film cooling, and thermal cooling effectiveness of tip 218. The lower airfoil tip metal temperatures of tip 218 result in increased airfoil tip durability, capability, and improved retention of the blade airfoil tip clearance necessary for maintaining engine performance characteristics throughout the operating life of the propulsion system.

Furthermore, as shown in FIG. 2A, optional trip strips 235 may be configured in one or more of the cavities 220, 228, 230 of the airfoil 201. Further, although shown as located in a part of the serpentine cavity 228, those of skill in the art will appreciate that the trip strips 235 can be located in various portions or subportions of any of the cavities 220, 228, 230. As shown, the trip strips 235 have a chevron configuration but those of skill in the art will appreciate that other geometries for trip strips may be used without departing from the scope of the present disclosure. The trip strips 235 may be provided to increase internal convective heat transfer and direct airflow at the wall within the thermal boundary layer toward the bypass aperture 240.

Figure 3:
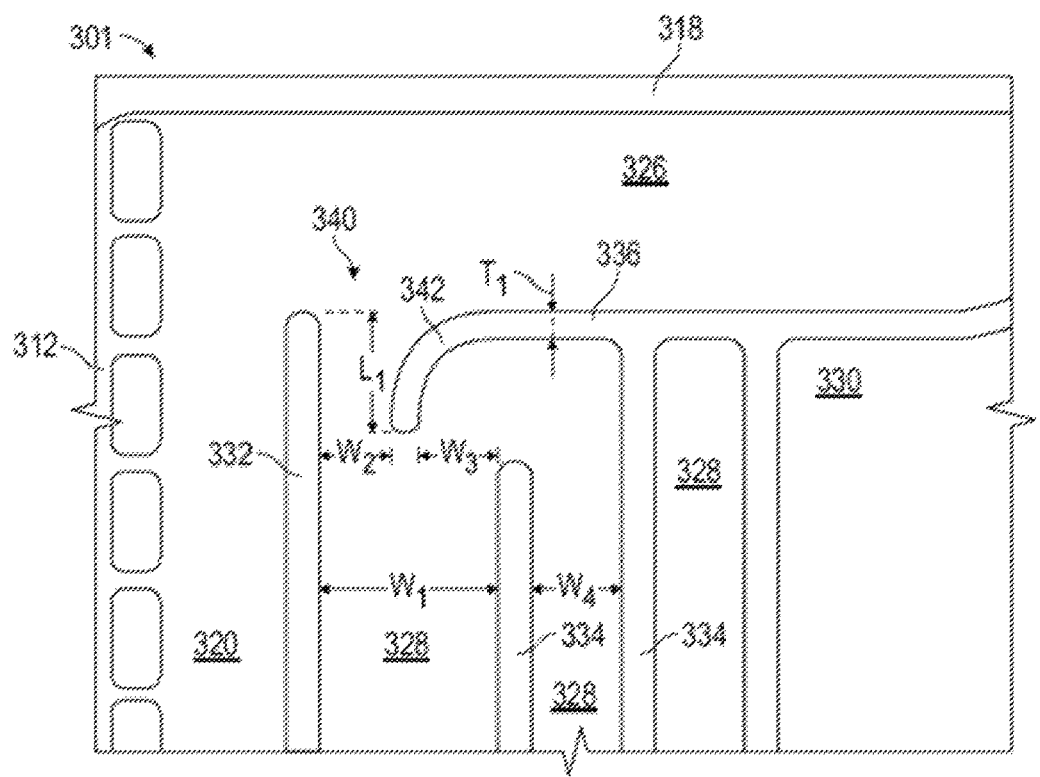
FIG. 3 is a schematic illustration of the internal structure of an airfoil in accordance with an embodiment of the present disclosure.

Turning now to FIG. 3, an enlarged schematic illustration of a bypass aperture in accordance with an embodiment of the present disclosure is shown. The configuration shown in FIG. 3 is of an airfoil similar to that shown and described with respect to FIGS. 2A and 2B. As shown, an airfoil 301 includes a leading edge cavity 320, a serpentine cavity 328, a trailing edge cavity 330, and a flag tip cavity 326. The cavities 320, 326, 328, and 330 are defined in part, by a leading edge 312, a first rib 332, a second rib 334, a third rib 336, and a tip 318.

As shown, the leading edge cavity 320 is in fluid communication with the flag tip cavity 326. Further, the serpentine cavity 328 is in fluid communication with the flag tip cavity 326 through a bypass aperture 340. In the embodiment shown, the bypass aperture 340 is partially defined by a portion of the first rib 332 and a divider portion 342.

The divider portion 342 may be configured to better control the distribution of coolant flow between the serpentine cavity 328 and the flag tip cavity 326. In the configuration shown in FIG. 3, the curvature of divider portion 342 allows the coolant flow from the serpentine cavity 328 to diffuse as it is mixed with the coolant flow from the leading edge cavity 320. As such, the momentum mixing and pressure loss that would occur immediately downstream of the bypass aperture 340 between the two flow streams as they are combined in the flag tip cavity 326 are minimized or reduced. Air flowing within the serpentine cavity 328 along the first rib 332 may be defined in part by a first width $W_1$ of the serpentine cavity 328. The first width $W_1$ may be a width or distance between the first rib 332 and a portion of the second rib 334 near the bypass aperture 340. The air within the serpentine cavity 328 may then split at the bypass aperture 340 with a first portion of air flowing through the bypass aperture 340 into the flag tip cavity 326 and a second portion of air flowing within the serpentine cavity 328. For example, a volume of the first portion of air may be defined in part by a second width $W_2$ that is a distance between the first rib 332 and the divider portion 342. A volume of the second portion of air may be defined in part by a third width $W_3$ that is a distance between the divider portion 342 and a part of the second rib 334.

That is, the first portion of air may flow from the serpentine cavity 328 into the flag tip cavity 326 through the bypass aperture and the second portion of air may continue flow within the serpentine cavity 328. As shown, the second portion of air may turn within the serpentine cavity 328 and enter another part of the serpentine cavity 328 defined in part by two portions of the second rib 334 and having a fourth width $W_4$. In some embodiments, the third width $W_3$ and the fourth width $W_4$ may be equal. In some embodiments, the second width $W_2$ and the third width $W_3$ may be equal.

As shown, the divider portion 342 may be an extension of the third (or axially extending) rib 336 located close to the tip of the airfoil 301. The third rib 336 may have a thickness T1. In some embodiments, the divider portion 342 may have the same thickness as the third rib 336. Further, the divider portion 342 may have a length L1 and extend into the serpentine cavity 328. In some embodiments, the second width W2 may be less than the first width W2. In some embodiments, first width W1 may be equal to the second width W1, the third width W3, and the thickness T1.

Figure 4A:
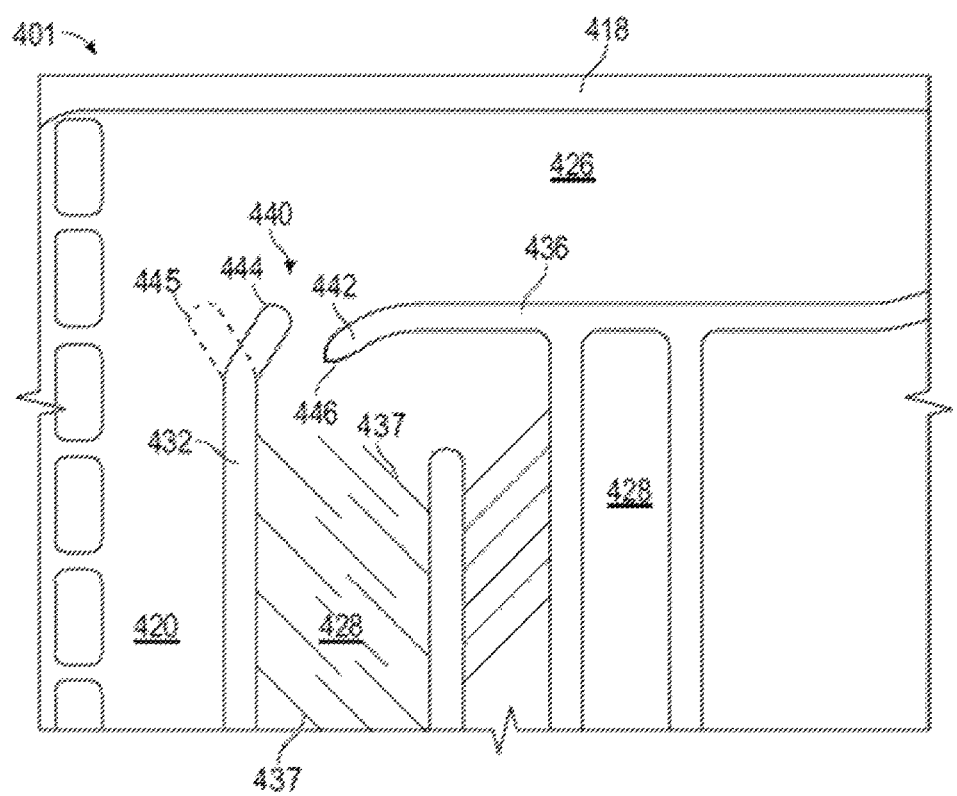
FIG. 4A is a schematic illustration of an alternative configuration of an airfoil in accordance with the present disclosure showing example features.

Turning now to FIG. 4A, an alternative configuration of an airfoil is shown having example features that may be employed in one or more embodiments of the present disclosure. The structure of the airfoil 400 is substantially similar to that shown in FIG. 3, with the airfoil 400 including a leading edge cavity 420 that is configured to supply air to a flag tip cavity 426 at a tip 418 of the airfoil 400. A bypass aperture 440 may be formed between a first rib 432 and portion of a third or axially extending rib 436. As shown, the bypass aperture 440 may be defined in part by a directional portion 444 of the first rib 432. The directional portion 444 may be an end of the first rib 432 having a curvature or other structure, geometry, and/or shape that is configured to aid in directing air from the serpentine cavity 428 into the flag tip cavity 426. Such structure, geometry, and/or shape may be selected to provide an axial velocity component to a coolant flow entering the flag tip cavity 426.

In an alternative configuration, the direction portion may be angled away from the bypass aperture 440. For example, as shown in broken lines, a direction portion 445 of the first rib 432 is shown. Accordingly, as will be appreciated by those of skill in the art, the first rib 432 may have a canted end or tip that is proximate the bypass aperture 440 (e.g., direction portions 444, 445, etc.). In configurations similar to direction portion 445 (e.g., away from the bypass aperture 440 and into the leading edge cavity 420), the canted rib allows for velocity of flow through the bypass aperture 440 to diffuse to reduce mixing loss from the leading edge cavity 420.

Similar to the design philosophy previously described with respect to FIG. 3, the directional component of the flow emanating from the serpentine cavity 428 through the bypass aperture 440 may be aligned in the axial direction as it is combined with the coolant flow from the leading edge cavity 420. The improved alignment between the two flow streams reduces the momentum mixing and pressure loss that would be incurred as the two flows are mixed in flag tip cavity 426 The coolant flow exiting bypass aperture 440 from the serpentine cavity 428 has sufficiently greater velocity with respect to the coolant flow from the leading edge cooling cavity 420. In this configuration the mixed cooling flow in the flag tip cavity 426 is accelerated due to jet pump characteristics associated with the high velocity cooling flow exiting through the bypass aperture 440 supplied from the serpentine cavity 428. The acceleration of the cooling flow increases the internal convective heat transfer improving the local thermal cooling effectiveness adjacent to the flag tip cavity 426.

Further, as shown, a divider portion 442 of the third rib 436 may be angled relative to a direction normal to the third rib 436. The angle of the divider portion 442 may be configured to aid in air flow both within the serpentine cavity 428 and through the bypass aperture 440. Further, in some embodiments, the divider portion 442 of the third rib 436 and the direction portion 444 of the first rib 432 may be configured parallel to each other or otherwise angled and configured with respect to each other.

Further, in some embodiments, the divider portion 442 may include a tapered tip 446. The tapered tip 446 may be configured to aid in air flow both within the serpentine cavity 428 and through the bypass aperture 440. In some embodiments, the tapering of the tapered tip 446 may form a point or defined point, edge, or end. In other embodiments, the tapered tip 446 may be rounded, as shown, for example, in FIG. 4A.

Additionally, as shown in FIG. 4A, optional trip strips 437 are shown. The trip strips 437 of FIG. 4A are skewed and segmented (as compared to the chevron trip strips 235 of FIG. 2A). Although shown in a particular configuration (e.g., geometry, length, skew angle, etc.), those of skill in the art will appreciate that other orientations and/or configurations can be used without departing from the scope of the present disclosure. For example, the skew angle of the trip strips 437 can be reversed. Various configurations and/or orientations of trip strips can be incorporated in various embodiments described herein, and may be configured based on, for example, flow and pressure loss requirements of the particular airfoil.

Figure 4B:
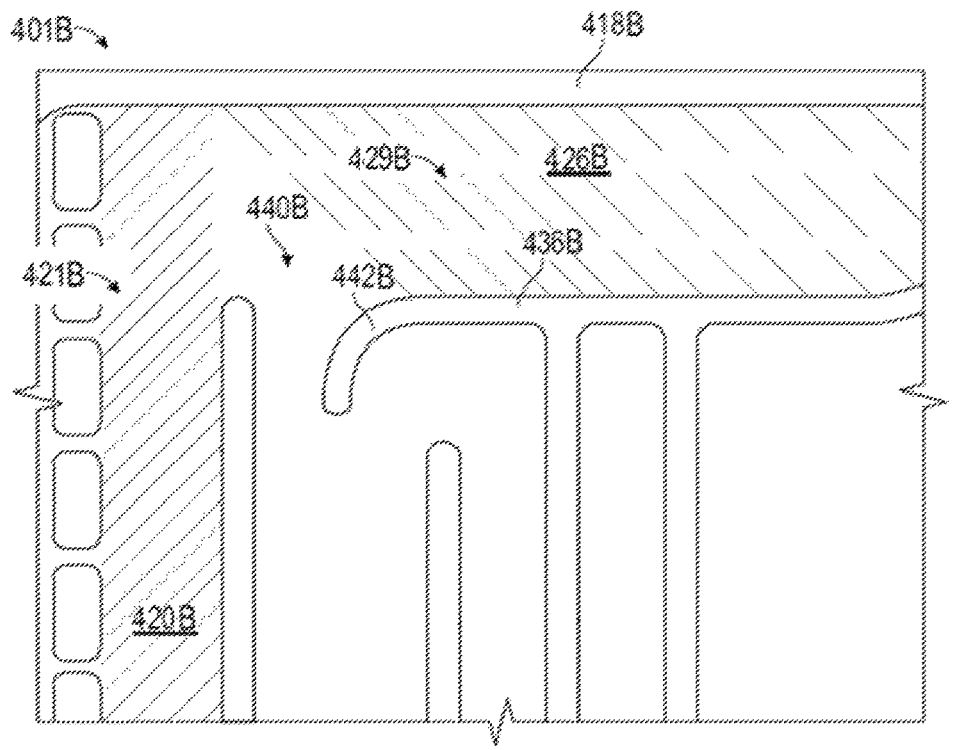
FIG. 4B is a schematic illustration of another alternative configuration of an airfoil in accordance with the present disclosure showing example features.

Turning now to FIG. 4B, another alternative configuration of an airfoil is shown having example features that may be employed in one or more embodiments of the present disclosure. In FIG. 4B, a leading edge cavity 420B includes a convective leading edge feature 421B, such as a plurality of trip strips and/or film cooling. Further, as shown, a convective flag tip feature 429B is shown. The convective flag tip feature 429B may be, for example, trip strips and/or film cooling, as known in the art.

Figure 4C:
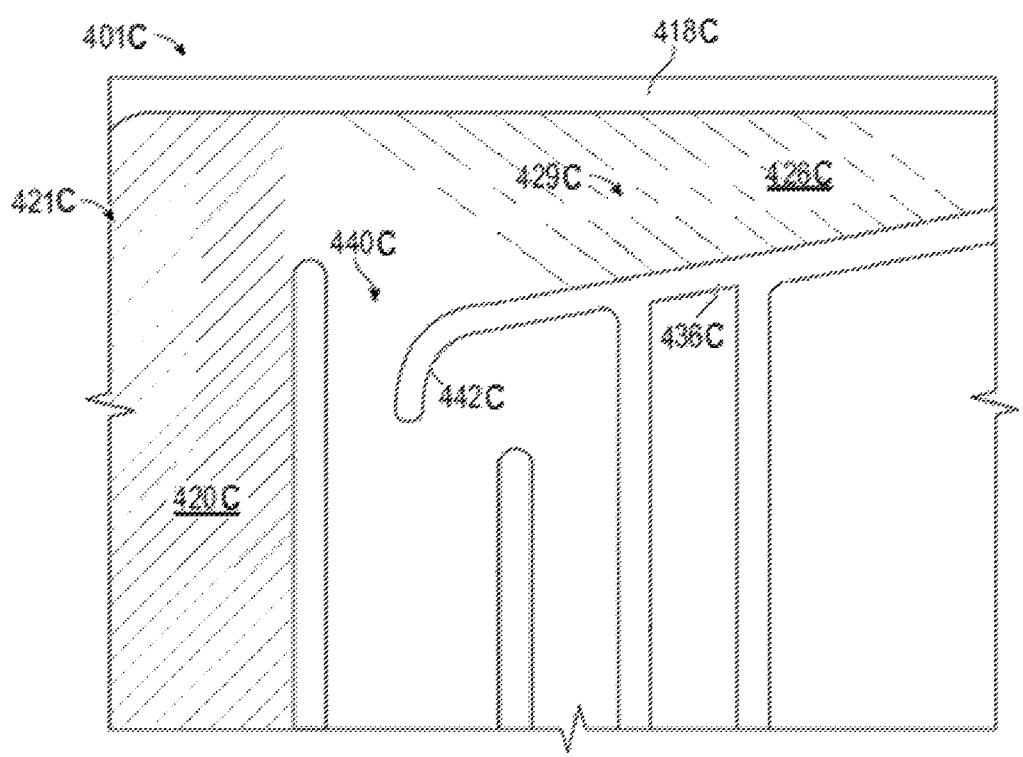
FIG. 4C is a schematic illustration of another alternative configuration of an airfoil in accordance with the present disclosure showing example features.

Turning now to FIG. 4C, another alternative configuration of an airfoil is shown having example features that may be employed in one or more embodiments of the present disclosure. In FIG. 4C, a leading edge cavity 420C includes a convective leading edge feature 421C, such as a plurality of trip strips and/or film cooling. Further, as shown, a convective flag tip feature 429C is shown. The convective flag tip feature 429C may be, for example, trip strips and/or film cooling, as known in the art. As shown, a bypass aperture 440C is formed between a first rib and a portion (e.g., divider portion 442C) of a third or axially extending rib 436C. In this embodiment, the axially extending (or third) rib 436C is not parallel with a tip 418C, but rather is angled with respect to the tip 418C. In this embodiment the airfoil 401C includes a convective leading edge with tip film cooling and convective tip flag cooling (i.e., there is no tip film cooling). However, variations thereon will be readily appreciated by those of skill in the art.

Figure 5:
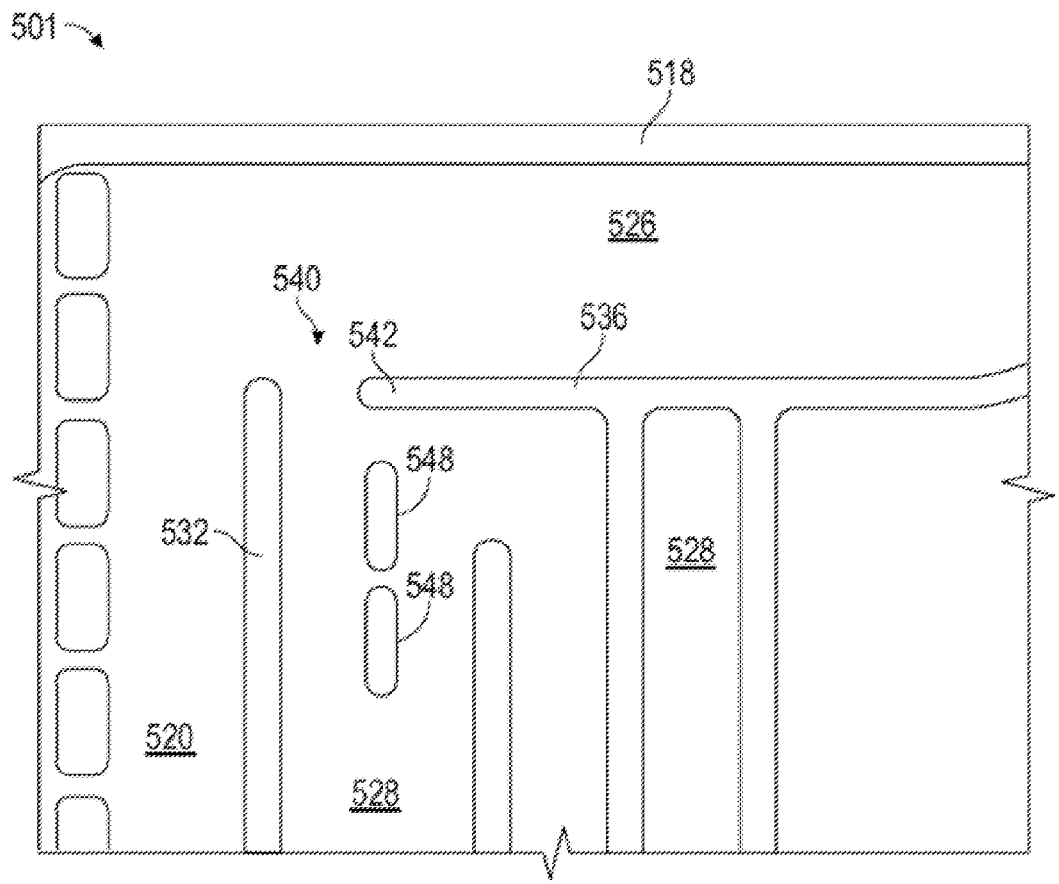
FIG. 5 is a schematic illustration of an alternative configuration of an airfoil in accordance with the present disclosure.

Turning now to FIG. 5, an alternative configuration of a bypass aperture in accordance with an embodiment of the present disclosure is shown. The structure of the airfoil 500 is substantially similar to that shown in FIG. 3, with the airfoil 500 including a leading edge cavity 520 that is configured to supply air to a flag tip cavity 526 at a tip 518 of the airfoil 500. A bypass aperture 540 may be formed between a first rib 532 and portion of a third or axially extending rib 536. As shown, the third or axially extending rib 536 does not include a divider portion as in the prior embodiments. That is, the bypass aperture 540 may be defined by a space between an end of the first rib 532 and an end of the third or axially extending rib 536.

Also shown in FIG. 5 are optional trip strips 548. The trip strips 548, as shown, are located within a portion of the serpentine cavity 528 near the bypass aperture 540. In some configurations, the optional trip strips may be heat transfer augmentation device, which may be located in any of the passages 520, 526, 528 and/or within the bypass aperture 540. The size, pitch, and/or configuration of the trip strips can be configured in conjunction with the various widths and/or dimensions of the cavities and/or ribs such that the flow split enabled by the bypass aperture 540 may be optimized.

As will be appreciated by those of skill in the art, various configurations, geometries, sizes, shapes, etc. of the structure surrounding and defining the bypass aperture may be used without departing from the scope of the present disclosure. For example, a triangular divider portion may be used. Further, in some embodiments, the divider portion may not be physically connected to the third or axially extending rib, but rather may be a discrete feature within the serpentine cavity of the airfoil. Further, an end of the first rib may form a structure that is configured to aid in the air flow within the airfoil. Further, as noted above, various features and/or structures shown and described above in the example embodiments (e.g., FIGS. 2A-5) can be combined and/or mix-and-matched such that other airfoils can be configured within the scope of the present disclosure.

Figure 6:
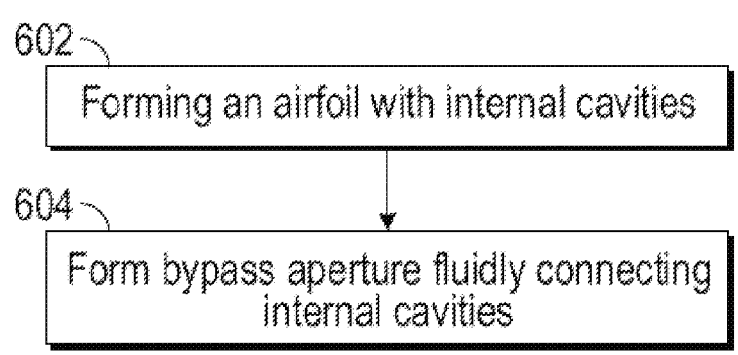
FIG. 6 is a flow process of forming an airfoil for a gas turbine engine in accordance with an embodiment of the present disclosure.

Turning now to FIG. 6, a flow process 600 for manufacturing an airfoil in accordance with a non-limiting embodiment of the present disclosure is shown. At block 602, an airfoil may be formed with internal cavities, including a leading edge cavity, a flag tip cavity, and a serpentine cavity. At block 904, a bypass aperture is formed to fluidly connect the serpentine cavity with the flag tip cavity such that the flag tip cavity is provided with air and/or airflow from both the leading edge cavity and the serpentine cavity. As will be appreciated by those of skill in the art, the steps of the flow process 900 may be performed simultaneously and/or nearly simultaneously, or as separate discrete steps. For example, blocks 902 and 904 may be performed simultaneously in a casting, molding, or additive manufacturing process.

Advantageously, embodiments described herein provide an airfoil having fluidly connected internal cavities such that the airflow may be increased into a flag tip cavity at a tip of the airfoil. Advantageously, bypass apertures as provided herein may enable a reduction in Mach number in leading edge cavity feed into the flag tip cavity, thereby reducing a risk of flow disturbances and viscous losses while optimizing heat transfer in airfoil and improve pressure availability downstream within the flag tip cavity. Further, advantageously, embodiments provided herein my enable improved back-flow margins for cooling holes fed by the leading edge cavity, which may be related to an increased pressure in the leading edge because the air within the flag tip cavity is supplemented and supplied in part from the serpentine cavity. Moreover, embodiments provided here may increase casting producibility of both the serpentine cavity and the flag tip cavity by directly and fluidly tying the two cavities together. Furthermore, embodiments provided herein may reduce casting cost by eliminating a tip rod from a serpentine up-pass.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described herein with respect to vanes and blades, those of skill in the art will appreciate that any type of airfoil or component requiring flow passages and bleed ports may employ embodiments described herein. For example, although described with respect to airfoils of gas turbine engines, those of skill in the art will appreciate that the airfoils are not limited to gas turbine engines, and embodiments described herein may be applied to any type of airfoil, end wall vane inner diameter or outer diameter platforms, blade airfoil platforms, and/or blade outer air seal cooling configurations that have internal cooling passages. Further, although described and shown with various example geometries and configurations, those of skill in the art will appreciate that variations on the disclosed shapes, geometries, etc. may be made without departing from the scope of the present disclosure. Moreover, although an aero or aircraft engine application is shown and described above, those of skill in the art will appreciate that airfoil configurations as described herein may be applied to industrial applications and/or industrial gas turbine engines, land based or otherwise.

Accordingly, the present disclosure is not to be seen as limited by the foregoing description, but is only limited by the scope of the appended claims.

What is claimed is:

1. An airfoil of a gas turbine engine comprising:
a leading edge extending in a radial direction;
a tip extending in an axial direction from the leading edge;
a first rib extending radially within the airfoil, the leading edge and the first rib defining a leading edge cavity within the airfoil;
a second rib, the second rib and the first rib defining a serpentine cavity therein;
a third rib extending axially within the tip, a flag tip cavity defined by the third rib, the leading edge, and the tip, the leading edge cavity fluidly connected to the flag tip cavity;
a bypass aperture formed between the first rib and the third rib, the bypass aperture configured to fluidly connect the serpentine cavity with the flag tip cavity, wherein the bypass aperture is located adjacent the first rib; and a divider portion located proximate to the bypass aperture within the serpentine cavity and configured to aid in directing (i) a first portion of air from the serpentine cavity into the flag tip cavity and (ii) a second portion of air within the serpentine cavity, wherein the first rib includes a direction portion proximate to the bypass aperture that is canted toward the leading edge and away from the bypass aperture and divider portion.

2. The airfoil of claim 1, wherein the divider portion is connected to the third rib.

3. The airfoil of claim 1, wherein the divider portion extends a predetermined length into the serpentine cavity.

4. The airfoil of claim 1, wherein the divider portion has a tapered tip extending into the serpentine cavity.

5. The airfoil of claim 1, further comprising a trip strip configured to aid in airflow from the serpentine cavity to the flag tip cavity through the bypass aperture.

6. The airfoil of claim 1, wherein a width of the serpentine cavity between the first rib and the second rib is a first width and a width of the bypass aperture is a second width, wherein the second width is less than the first width.

7. The airfoil of claim 1, further comprising a convective feature within at least one of the leading edge cavity, the flag tip cavity, or the serpentine cavity.

8. The airfoil of claim 7, wherein the convective feature is a plurality of trip strips.

9. The airfoil of claim 1, further comprising film cooling holes configured in at least one of the leading edge, the tip, or the flag tip cavity.

10. A gas turbine engine comprising:
an airfoil having:
a leading edge extending in a radial direction;
a tip extending in an axial direction form the leading edge;
a first rib extending radially within the airfoil, the leading edge and the first rib defining a leading edge cavity within the airfoil;
a second rib, the second rib and the first rib defining a serpentine cavity therein;
a third rib extending axially within the tip, a flag tip cavity defined by the third rib, the leading edge, and the tip, the leading edge cavity fluidly connected to the flag tip cavity;
a bypass aperture formed between the first rib and the third rib, the bypass aperture configured to fluidly connect the serpentine cavity with the flag tip cavity, wherein the bypass aperture is located adjacent the first rib; and
a divider portion located proximate to the bypass aperture within the serpentine cavity and configured to aid in directing (i) a first portion of air from the serpentine cavity into the flag tip cavity and (ii) a second portion of air within the serpentine cavity,
wherein the first rib includes a direction portion proximate to the bypass aperture that is canted toward the leading edge and away from the bypass aperture and divider portion.

11. The gas turbine engine of claim 10, wherein the divider portion is connected to the third rib.

12. The gas turbine engine of claim 10, wherein the divider portion extends a predetermined length into the serpentine cavity.

13. The gas turbine engine of claim 10, wherein the divider portion has a tapered tip extending into the serpentine cavity.

14. The gas turbine engine of claim 10, wherein the divider portion is radially angled relative to the axial direction of the third rib.

15. The gas turbine engine of claim 10, wherein a width of the serpentine cavity between the first rib and the second rib is a first width and a width of the bypass aperture is a second width, wherein the second width is less than the first width.

* * * * *